(12) United States Patent
Oh et al.

(10) Patent No.: US 12,719,058 B2
(45) Date of Patent: Aug. 25, 2026

(54) CONDUCTIVE COMPOSITE MATERIAL, METHOD OF PREPARING SAME, AND LITHIUM SECONDARY BATTERY COMPRISING SAME

(71) Applicants: Hyundai Motor Company, Seoul (KR); Kia Corporation, Seoul (KR); Research & Business Foundation Sungkyunkwan University, Suwon-Si (KR)

(72) Inventors: Seung Min Oh, Incheon (KR); Sung Ho Ban, Hwaseong-Si (KR); Sang Hun Lee, Paju-Si (KR); Ko Eun Kim, Cheongju-Si (KR); Yoon Sung Lee, Suwon-Si (KR); Chang Hoon Song, Seoul (KR); Hyeong Jun Choi, Suwon-Si (KR); Jun Myoung Sheem, Suwon-Si (KR); Jin Kyo Koo, Suwon-si (KR); Young Jun Kim, Seongnam-si (KR)

(73) Assignees: Hyundai Motor Company, Seoul (KR); Kia Corporation, Seoul (KR); Research & Business Foundation Sungkyunkwan University, Suwon-si (KR)

( * ) Notice: Subject to any disclaimer, the term of this patent is extended or adjusted under 35 U.S.C. 154(b) by 523 days.

(21) Appl. No.: 18/371,275

(22) Filed: Sep. 21, 2023

(65) Prior Publication Data

US 2024/0136531 A1 Apr. 25, 2024
US 2024/0234735 A9 Jul. 11, 2024

(30) Foreign Application Priority Data

Oct. 25, 2022 (KR) ........................ 10-2022-0138547

(51) Int. Cl.
*H01M 4/62* (2006.01)
*H01M 10/052* (2010.01)

(52) U.S. Cl.
CPC ........... *H01M 4/625* (2013.01); *H01M 4/623* (2013.01); *H01M 10/052* (2013.01)

(58) Field of Classification Search
None
See application file for complete search history.

(56) References Cited

U.S. PATENT DOCUMENTS 7,087,348 B2 8/2006 Holman et al.
11,824,201 B1 * 11/2023 Bosnyak ............... H01M 4/622
(Continued)

FOREIGN PATENT DOCUMENTS

KR 10-1991-0008863 10/1991
KR 101164287 B1 7/2012
(Continued)

OTHER PUBLICATIONS

Choi et al. NPL article (Year: 2023).*
Gao et al. NPL article (Year: 2019).*
Google Translation of JPH06316784 A (Year: 1994).*

*Primary Examiner* — Kevin M Bernatz
(74) *Attorney, Agent, or Firm* — Banner & Witcoff, Ltd.

(57) ABSTRACT

A conductive composite material, a method of preparing the same, and a secondary battery including the same. The conductive composite material may increase the proportion of an active material when forming an electrode by chemically bonding a conductive material and a binder to each other. A method of preparing the conductive composite material comprises ionizing carbon-based particles in a predetermined polarity, ionizing PTFE particles in a polarity different from that of the carbon-based particles, and chemically bonding the ionized carbon-based particles and the (Continued)

ionized PTFE particles, which are ionized in different polarities, to each other.

14 Claims, 10 Drawing Sheets

(56) References Cited

U.S. PATENT DOCUMENTS

| | | | | |
|---|---|---|---|---|
| 2010/0086787 | A1 * | 4/2010 | Qi | G03G 15/2057<br>524/502 |
| 2016/0164080 | A1 * | 6/2016 | Kim | H01M 12/08<br>429/405 |
| 2021/0399365 | A1 * | 12/2021 | Son | H01M 4/133 |
| 2024/0128460 | A1 * | 4/2024 | Feng | H01M 4/62 |
| 2025/0205395 | A1 * | 6/2025 | Nakai | A61L 29/085 |

FOREIGN PATENT DOCUMENTS

| | | | | | |
|---|---|---|---|---|---|
| KR | 101211134 | B1 | * | 12/2012 | H01B 13/00 |
| KR | 10-2015-0024104 | A | | 3/2015 | |
| KR | 101741327 | | | 5/2017 | |
| KR | 10-2019-0012780 | A | | 2/2019 | |
| KR | 20190012768 | A | * | 2/2019 | C08L 27/18 |
| KR | 20190012780 | A | * | 2/2019 | B01F 7/00341 |
| KR | 101954647 | B1 | | 3/2019 | |
| WO | 89/03766 | A1 | | 5/1989 | |

* cited by examiner

CONDUCTIVE COMPOSITE MATERIAL, METHOD OF PREPARING SAME, AND LITHIUM SECONDARY BATTERY COMPRISING SAME

CROSS-REFERENCE TO RELATED APPLICATION

This application claims priority from Korean Patent Application No. 10-2022-0138547, filed on Oct. 25, 2022, in the Korean Intellectual Property Office, the entire contents of which are incorporated herein by reference.

BACKGROUND

1. Technical Field

The present disclosure relates to a conductive composite material, a method of preparing the same, and a lithium secondary battery including the same.

2. Discussion of Background

Secondary batteries are used as large-capacity power storage batteries for electric vehicles or battery power storage systems, and as small high-performance energy sources for portable electronic devices such as mobile phones, camcorders, laptop computers, and the like. There is a demand for a secondary battery capable of achieving a small size and high capacity, including research into weight reduction of parts and low power consumption in order to realize size reduction of portable electronic devices and continuous use thereof for a long time.

In particular, a lithium secondary battery, which is a typical secondary battery, has a higher energy density, a larger capacity per area, a lower self-discharge rate, and a longer lifespan than a nickel manganese battery or a nickel cadmium battery. Also, since there is no memory effect, a lithium secondary battery has the characteristics of convenience of use and long lifespan.

Lithium secondary batteries serve to produce electric energy through oxidation and reduction reactions when lithium ions are intercalated/deintercalated at the cathode and anode in a state in which an electrolyte is charged between the cathode and anode that are made of active materials capable of intercalation and deintercalation of lithium ions.

These lithium secondary batteries are configured to include a cathode, an electrolyte, a separator, and an anode. In order to improve the energy density of a lithium secondary battery, it is important to increase the capacity of each material constituting the lithium secondary battery. It is further known that methods of thickening the coating material to be applied onto the electrode substrate constituting the electrode or increasing the proportion of the electrode active material are more important.

However, limitations are imposed on increasing the electrode thickness using a conventional wet process. In order to overcome this problem, a dry electrode manufacturing method has recently gained attention.

For this dry electrode manufacturing method, it is necessary to use a polytetrafluoroethylene (PTFE)-based dry electrode binder, rather than a conventional PVdF binder. However, problems occur in view of conductivity and dispersibility.

Hence, with the goal of overcoming this problem, various methods of compounding the PTFE binder with a carbon-based conductive material have already been developed. However, the method of compounding the PTFE binder and the conductive material is generally problematic in that additional equipment is required or PTFE has to be formed in a solution state and then compounded with the conductive material. Thus, the process for preparing the composite material is complicated, and mass productivity is low.

The descriptions in this background section are provided to enhance understanding of the background of the disclosure, and are not to be taken as an admission that the above-described details correspond to conventional technology already known to those of ordinary skilled in the art to which this technology belongs.

SUMMARY

The following summary presents a simplified summary of certain features. The summary is not an extensive overview and is not intended to identify key or critical elements.

The present disclosure has been made to provide a conductive composite material capable of increasing the proportion of a cathode active material (e.g., the proportion of the amount of the active material in mixed materials) if forming an electrode by chemically bonding a conductive material and a binder to each other, a method of preparing the same, and a lithium secondary battery including the same.

The conductive composite material of the disclosure may have strong chemical resistance to chemicals and low electrical resistance and may be variously used in engineering fields such as secondary batteries, etc.

The technical objects to be achieved by the present disclosure are not limited to the foregoing, and other technical objects not mentioned herein are to be clearly understood by those skilled in the art.

A method of preparing a conductive composite material may comprise: ionizing carbon-based particles in a polarity; ionizing polytetrafluoroethylene (PTFE) particles in a polarity different from the polarity of the carbon-based particles; and chemically bonding the ionized carbon-based particles and the ionized PTFE particles to each other.

The ionizing carbon-based particles may comprise dispersing the carbon-based particles and a first ionizing surfactant in an organic solvent to prepare a first dispersion. The ionizing PTFE particles may comprise dispersing the PTFE particles and a second ionizing surfactant in an organic solvent to prepare a second dispersion.

The first ionizing surfactant may be a ribonucleic acid (RNA)-based anionic surfactant, and the second ionizing surfactant may be a cetyltrimethylammonium bromide (CTAB)-based cationic surfactant.

The first dispersion may comprise the carbon-based particles and the first ionizing surfactant dispersed in a weight ratio of about 1:0.01 to about 1:1, and the second dispersion may comprise the PTFE particles and the second ionizing surfactant dispersed in a weight ratio of about 1:0.01 to about 1:1.

The chemically bonding may comprise: mixing the first dispersion and the second dispersion together and stirring to form a stirred mixed dispersion; separating a composite product from the stirred mixed dispersion; and drying the separated composite product to obtain a composite material in powder form.

The stirred mixed dispersion may comprise the carbon-based particles and the PTFE particles in a weight ratio of about 0.1:1 to about 1:1.

The composite product may be separated by centrifuging the stirred mixed dispersion.

The separated composite product may be dried at a temperature of about 100° C. or less.

A conductive composite material may comprise carbon-based particles ionized in a polarity and polytetrafluoroethylene (PTFE) particles ionized in a polarity different from the polarity of the carbon-based particles, wherein the ionized carbon-based particles and the ionized PTFE particles are chemically bonded to each other.

The ionized carbon-based particles and the ionized PTFE particles may be bonded through any one selected from the group consisting of: an ionic bond, a n-n transition bond, a hydrogen bond, or combinations thereof.

The ionized carbon-based particles and the ionized PTFE particles may be bonded in a weight ratio of about 0.1:1 to about 1:1.

The carbon-based particles may be at least one selected from the group consisting of: carbon allotropes comprising carbon black, vapor grown carbon fiber (VGCF), graphite, carbon nanotube (CNT), graphene, and fullerene.

A lithium secondary battery may comprise: a cathode comprising a conductive composite material and a cathode active material; an anode comprising an anode active material; and an electrolyte, wherein the conductive composite material comprises: carbon-based particles ionized in a polarity; and polytetrafluoroethylene (PTFE) particles ionized in a polarity different from the polarity of the carbon-based particles, wherein the ionized carbon-based particles and the ionized PTFE particles are chemically bonded to each other.

The cathode may comprise an electrode substrate, and wherein the cathode active material and the conductive composite material are disposed onto the electrode substrate.

These and other features and advantages are described in greater detail below.

DETAILED DESCRIPTION

Figure 1:
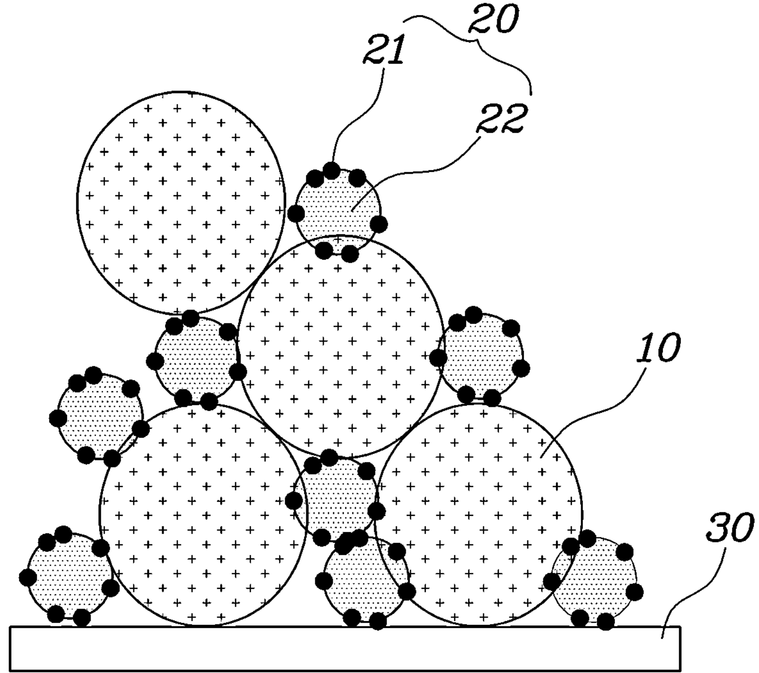
FIG. 1 schematically shows a cathode including a conductive composite material.

Hereinafter, examples disclosed in the present specification will be described in detail with reference to the accompanying drawings, but the same or similar elements are assigned the same reference numerals throughout the drawings, and overlapping descriptions thereof will be omitted.

In describing the various examples disclosed herein, if it is determined that detailed descriptions of related known technologies may obscure the gist of the examples disclosed in the present specification, the detailed description thereof will be omitted. In addition, the accompanying drawings are merely set forth to illustrate the examples disclosed in the present specification, and it is to be understood that the technical idea disclosed herein is not limited by the accompanying drawings, and includes all modifications, equivalents and substitutes incorporated in the spirit and scope of the present disclosure.

Terms including ordinal numbers, such as “first”, “second”, etc., may be used to describe various elements, but the elements are not limited by the terms. The above terms are used only for the purpose of distinguishing one element from another.

It will be further understood that the terms “comprise”, “include”, “have”, etc., when used in this specification, specify the presence of stated features, integers, steps, operations, elements, components, or combinations thereof, but do not preclude the presence or addition of one or more other features, integers, steps, operations, elements, components, or combinations thereof.

FIG. 1 schematically shows a cathode including a conductive composite material.

As shown in FIG. 1, the conductive composite material may be a material for forming an electrode, such as a cathode, applied to a lithium secondary battery, and includes carbon-based particles 21 and polytetrafluoroethylene particles 22 (hereinafter referred to as “PTFE particles”), which are chemically bonded to each other.

The lithium secondary battery includes a cathode including the conductive composite material 20, an anode including an anode active material, and an electrolyte. In FIG. 1, reference numeral 10 denotes a cathode active material, and reference numeral 30 denotes an electrode substrate forming the cathode.

The cathode may be formed by coating the electrode substrate 30 with the cathode active material 10 and the conductive composite material 20; and optionally further comprising a conductive material including carbon-based particles such as carbon black in order to improve conductivity.

The conductive composite material 20 may be a material capable of implementing both the role of the conductive material and the role of the binder by chemically bonding the conductive material and the binder forming the cathode. The carbon-based particles may be applied as the conductive material, and PTFE particles may be applied as the binder.

The carbon-based particles may be at least one selected from among carbon allotropes, including carbon black, VGCF (vapor grown carbon fiber), graphite, CNT (carbon nanotube), graphene, and fullerene.

In order to chemically bond the carbon-based particles and the PTFE particles to each other, carbon-based particles ionized in a predetermined polarity and PTFE particles ionized in a polarity different from that of the carbon-based particles are applied. The carbon-based particles may be ionized such that the surface thereof is in a cationic state, and the PTFE particles may be ionized such that the surface thereof is in an anionic state.

The carbon-based particles ionized in a cationic state and the PTFE particles ionized in an anionic state may be chemically bonded to each other through any one or more selected from among an ionic bond due to individually ionized charge interactions, a $\pi$-$\pi$ transition bond, and a hydrogen bond.

The carbon-based particles and the PTFE particles may be bonded in a weight ratio of about 0.1:1 to about 1:1.

The method of preparing the conductive composite material may include ionizing carbon-based particles in a predetermined polarity, ionizing PTFE particles in a polarity different from that of the carbon-based particles, and chemically bonding the carbon-based particles and the PTFE particles, which are ionized in different polarities, to each other.

Ionizing the surface of the carbon-based particles to a cationic state may comprise contacting the surface of the carbon-based particles with a first ionizing surfactant. A first dispersion may be prepared by dispersing the carbon-based particles and a first ionizing surfactant in an organic solvent.

Carbon black, which is carbon allotrope particles, and a ribonucleic acid (RNA)-based anionic surfactant, as the first ionizing surfactant, may be added to an organic solvent and then stirred to obtain a first dispersion.

The carbon-based particles and the first ionizing surfactant in a weight ratio of about 1:0.01 to about 1:1 may be mixed in the organic solvent to be dispersed.

In order to sufficiently disperse and activate the carbon-based particles and the first ionizing surfactant, the first dispersion comprising the carbon-based particles and the first ionizing surfactant mixture may be placed in a stirrer and stirred at a speed of about 100 to about 15,000 rpm.

Ionizing the surface of the PTFE particles to an anionic state may comprise contacting the surface of the PTFE particles with a second ionizing surfactant.

A second dispersion may be prepared by dispersing the PTFE particles and a second ionizing surfactant in an organic solvent.

The PTFE particles and the second ionizing surfactant, which may be a CTAB-based cationic surfactant, may be added to an organic solvent and stirred to obtain a second dispersion.

The PTFE particles and the second ionizing surfactant in a weight ratio of about 1:0.01 to about 1:1 may be mixed in the organic solvent to be dispersed.

In order to sufficiently disperse and activate the PTFE particles and the second ionizing surfactant, the second dispersion comprising the PTFE particles and the second ionizing surfactant mixture may be placed in a stirrer and stirred at a speed of about 100 to about 15,000 rpm.

Chemically bonding is a step of chemically bonding the carbon-based particles, the surface of which is ionized in a cationic state, and the PTFE particles, the surface of which is ionized in an anionic state, to each other.

The chemically bonding may include mixing together and stirring the first dispersion and the second dispersion, separating a composite product from the stirred mixed dispersion, and drying the separated composite product to obtain a composite material in a powder form.

The first dispersion and the second dispersion may be mixed and stirred sufficiently, such that the ionized carbon-based particles dispersed in the first dispersion and the ionized PTFE particles dispersed in the second dispersion are bonded to each other.

The first dispersion in which the ionized carbon-based particles are dispersed and the second dispersion in which the ionized PTFE particles are dispersed may be mixed with each other, and then placed in a stirrer and stirred at a speed of about 100 to about 15,000 rpm.

The first dispersion and the second dispersion may be mixed so that the carbon-based particles contained in the first dispersion and the PTFE particles contained in the second dispersion are present in a weight ratio of about 0.1:1 to about 1:1.

During the stirring process, the ionized carbon-based particles in the first dispersion and the ionized PTFE particles in the second dispersion may be bonded to each other through electrostatic attractions between anions and cations activated on the surfaces thereof. Moreover, n-n transition bonding and/or hydrogen bonding may occur between the carbon-based particles and the PTFE particles.

The composite product obtained by bonding the carbon-based particles and the PTFE particles may be separated from the stirred mixed dispersion.

The composite product may be separated by centrifuging the mixed dispersion.

Centrifugation may be performed at a speed of about 100 to about 15,000 rpm for separation of the composite product.

The composite product separated through centrifugation may be dried to obtain a composite material in power form.

The drying process may be performed at a temperature in a range of about 20° C. to about 100° C. in order to prevent chemical bonding between the carbon-based particles and the PTFE particles from breaking.

The composite product may be dried at room temperature.

A better understanding of the present invention may be obtained through the following comparative examples and examples.

Various Examples and Comparative Examples were prepared in order to evaluate the state and performance of a conductive composite material and a lithium secondary battery. The following descriptions are not intended to limit the scope of the disclosure.

Example 1

A first dispersion was prepared by adding 0.5 g of carbon black serving as carbon-based particles and 0.25 g of ribonucleic acid (RNA) serving as a first ionizing surfactant to 200 ml of ethanol, followed by tip sonication.

Then, a second dispersion was prepared by adding 0.5 g of PTFE and 0.5 g of cetyltrimethylammonium bromide (CTAB) serving as a second ionizing surfactant to 200 ml of ethanol, followed by stirring at 300 rpm.

Then, the first dispersion was added to the second dispersion so that PTFE and carbon black were mixed in a weight ratio of 1:1, after which the resulting mixture was stirred with a Vortex mixer for 5 minutes.

Then, the mixed dispersion was centrifuged at 4000 rpm for 5 minutes to afford a composite product in a powder form, which was then dried at room temperature to obtain a final conductive composite material.

The conductive composite material thus obtained and a $LiNi_{0.88}CO_{0.07}Mn_{0.03}Al_{0.02}O_2$ cathode active material were mixed in a dry manner without a solvent in a weight ratio of cathode active material to conductive material (carbon black) to conductive composite material of 96:2:2, and the resulting mixture was applied onto an electrode substrate to form a cathode. The dry cathode thus formed was pressed to an electrode density of 3.4 g/cc, and a coin cell was manufactured and evaluated.

Example 2

A coin cell was manufactured in the same manner as in Example 1, with the exception that the ratio of PTFE to carbon black was changed to 1:0.1 when preparing the conductive composite material in Example 1.

Example 3

A coin cell was manufactured in the same manner as in Example 1, with the exception that the ratio of PTFE to carbon black was changed to 1:0.5 when preparing the conductive composite material in Example 1.

Example 4

A coin cell was manufactured in the same manner as in Example 1, with the exception that $LiNi_{0.6}CO_{0.2}Mn_{0.2}O_2$ was used as the cathode active material.

Example 5

A coin cell was manufactured in the same manner as in Example 4, with the exception that the ratio of PTFE to carbon black was changed to 1:0.1 when preparing the conductive composite material in Example 4.

Example 6

A coin cell was manufactured in the same manner as in Example 4, with the exception that the ratio of PTFE to carbon black was changed to 1:0.5 when preparing the conductive composite material in Example 4.

Example 7

A coin cell was manufactured in the same manner as in Example 1, with the exception that NCA single crystal was used as the cathode active material.

Example 8

A coin cell was manufactured in the same manner as in Example 7, with the exception that the ratio of PTFE to carbon black was changed to 1:0.1 when preparing the conductive composite material in Example 7.

Example 9

A coin cell was manufactured in the same manner as in Example 7, with the exception that the ratio of PTFE to carbon black was changed to 1:0.5 when preparing the conductive composite material in Example 7.

Example 10

A coin cell was manufactured in the same manner as in Example 1, with the exception that the weight ratio of cathode active material to conductive material (carbon black) to conductive composite material was changed to 98:1:1 when manufacturing the dry cathode in Example 1.

Comparative Example 1

A coin cell was manufactured in the same manner as in Example 1, with the exception that polyvinylidene fluoride (PVdF) was used as a binder instead of the conductive composite material, and N-Methyl-2-pyrrolidone (NMP) was used as a solvent when manufacturing the electrode.

Comparative Example 2

A coin cell was manufactured in the same manner as in Example 1, with the exception that the conductive composite material was not used and carbon black and PTFE were used separately.

Comparative Example 3

A coin cell was manufactured in the same manner as in Example 1, with the exception that the weight ratio of cathode active material to conductive material (carbon black) to conductive composite material was changed to 98:0:2, and the electrode density was changed to 3.8 g/cc.

Comparative Example 4

A coin cell was manufactured in the same manner as in Example 1, with the exception that the conductive composite material was not used, carbon black and PTFE were used separately, and the weight ratio of cathode active material to conductive material (carbon black) to PTFE was changed to 98:1:1.

Specifically, SEM images of the conductive composite material according to Example 1 were observed in order to evaluate the bonding state of the carbon-based particles and the PTFE particles constituting the conductive composite material. Here, SEM images of PTFE particles and carbon black serving as carbon-based particles were also observed as a control.

Figure 2A:
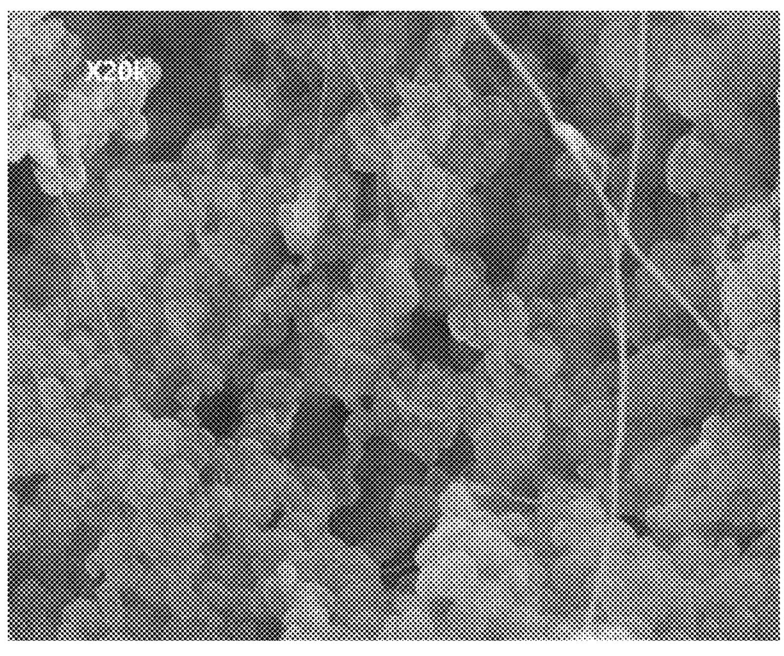
FIG. 2A shows an SEM image of PTFE particles.
Figure 2B:
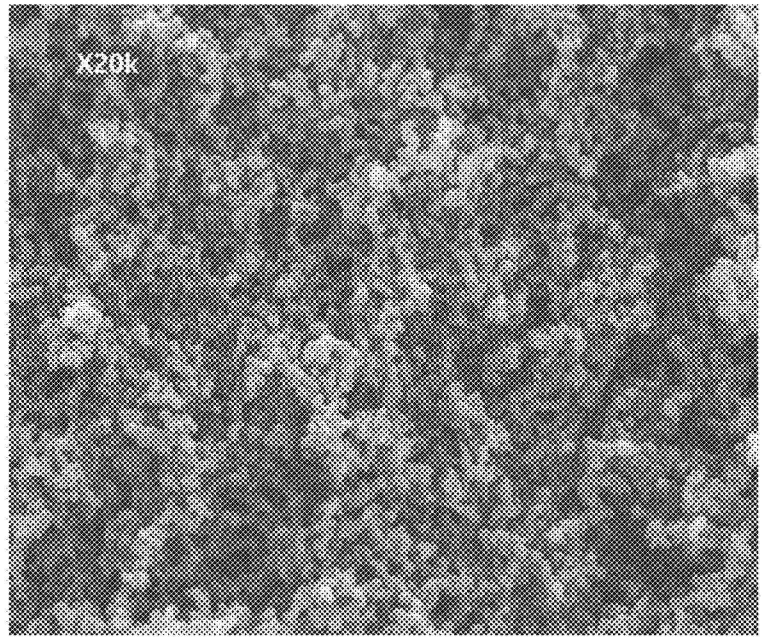
FIG. 2B shows an SEM image of carbon-based particles.
Figure 2C:
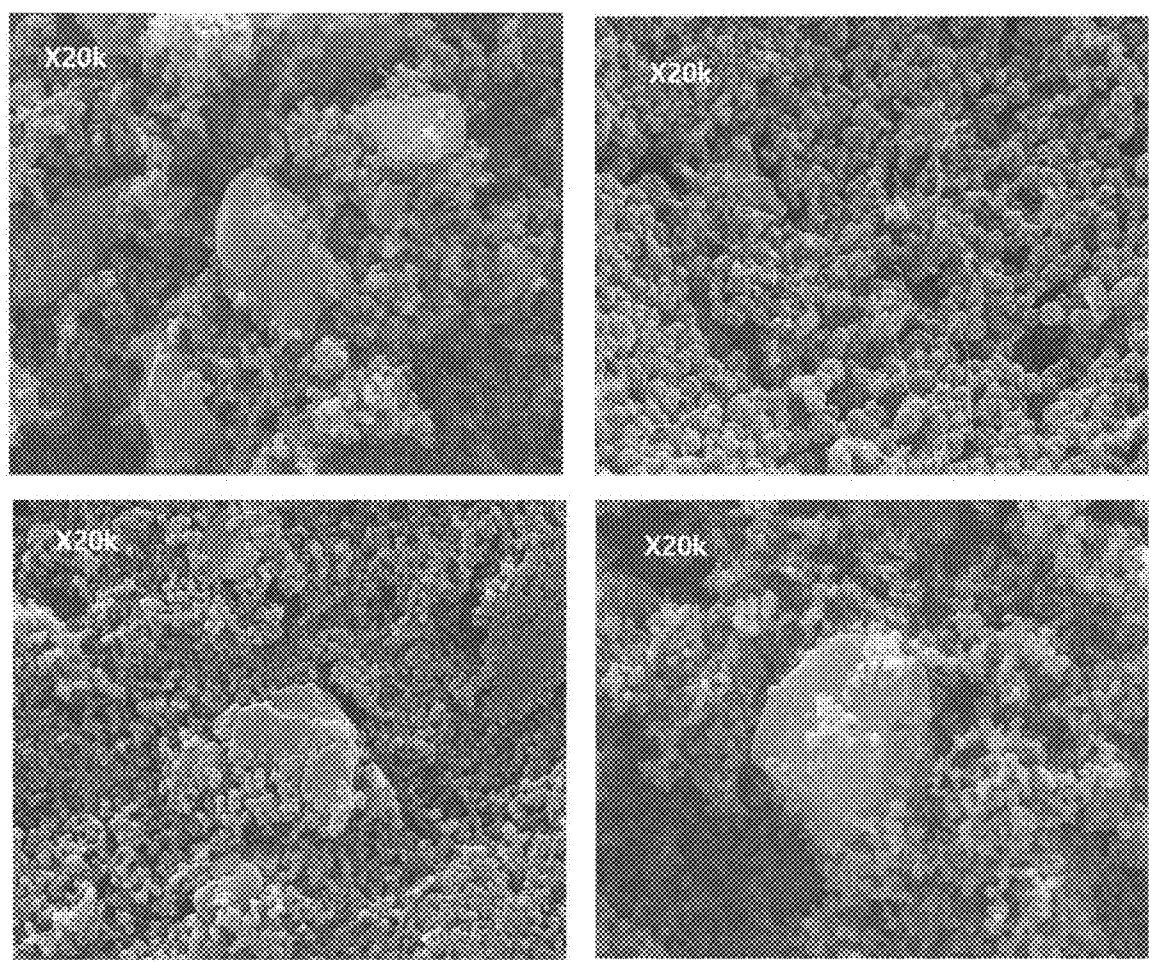
FIG. 2C shows SEM images of a conductive composite material.

FIG. 2A shows an SEM image of the PTFE particles, FIG. 2B shows an SEM image of the carbon-based particles, and FIG. 2C show SEM images of the conductive composite material.

As shown in FIGS. 2A to 2C, in the conductive composite material, it was confirmed that the carbon-based particles were relatively uniformly distributed and bonded to the surface of the PTFE particles.

Figure 3:
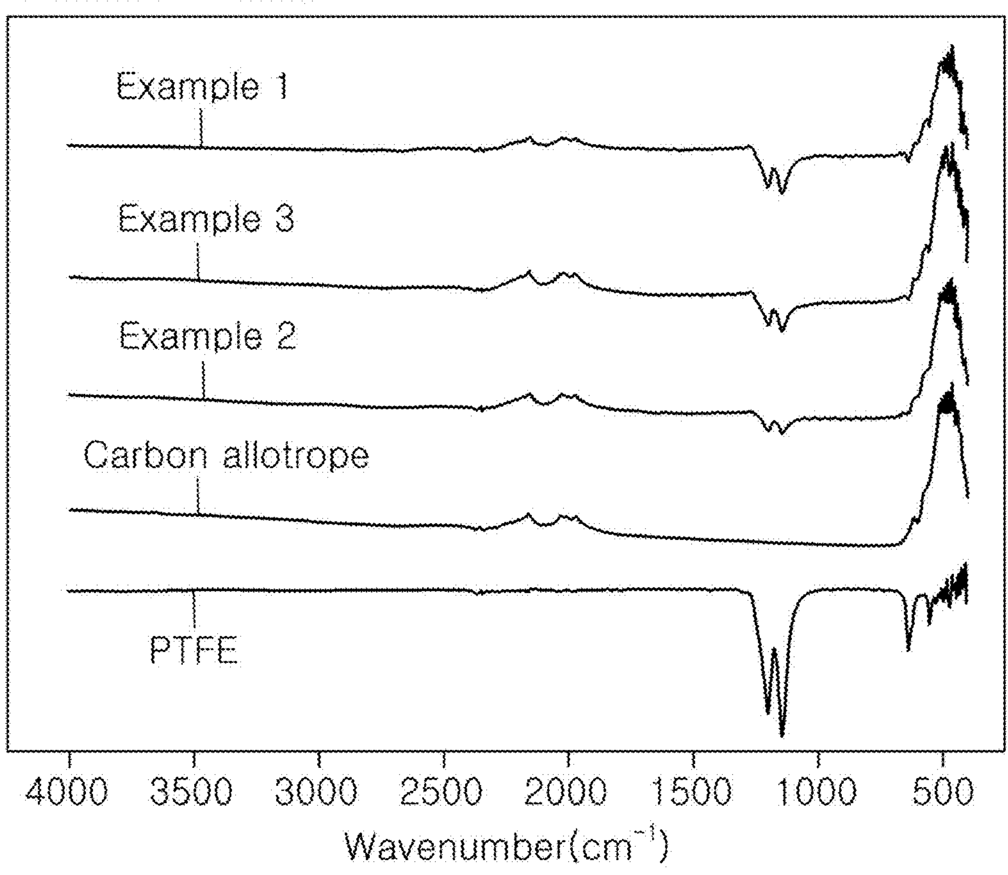
FIG. 3 shows results of FT-IR of Comparative Examples and Examples.
Figure 4:
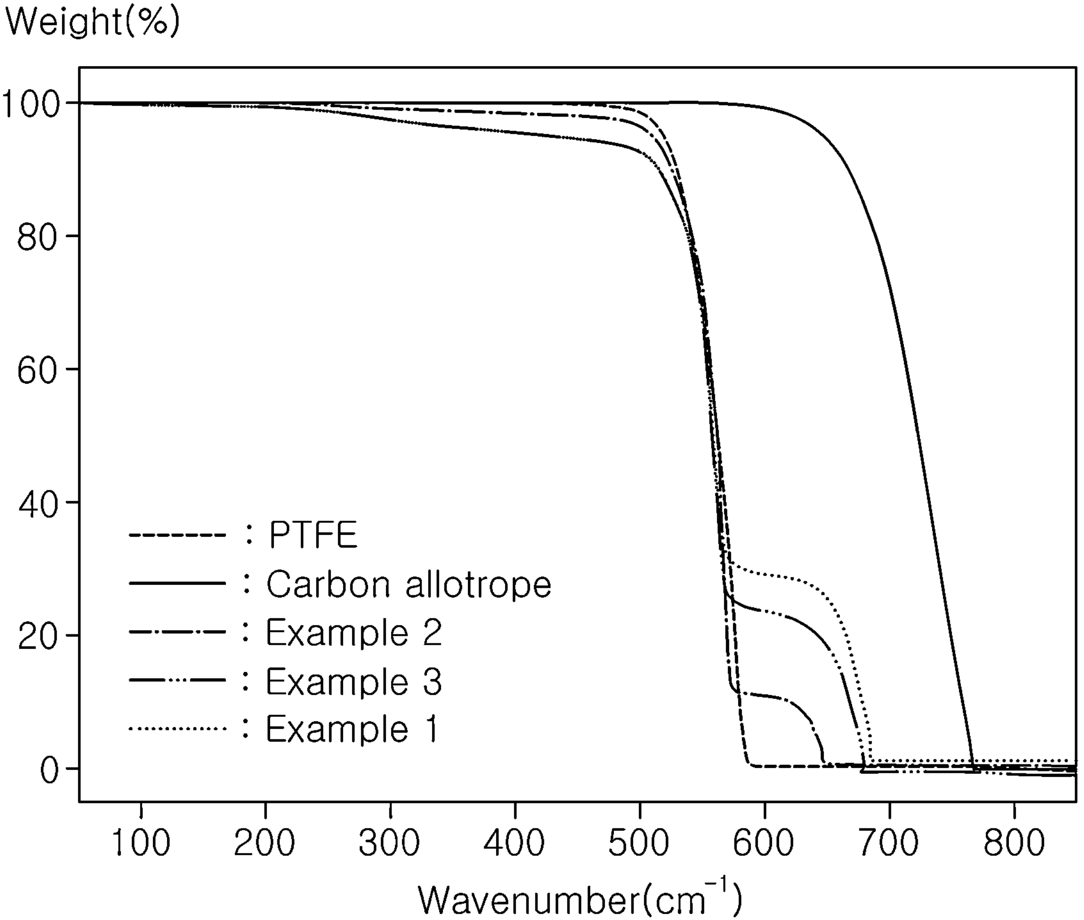
FIG. 4 shows results of TGA of Comparative Examples and Examples.

In addition, FT-IR and TGA were performed on the conductive composite material, PTFE particles, and carbon-based particles according to Examples 1 to 3, and the results thereof are shown in FIGS. 3 and 4.

FIG. 3 shows results of FT-IR of Comparative Examples and Examples, and FIG. 4 shows results of TGA of Comparative Examples and Examples.

As shown in FIGS. 3 and 4, it was confirmed that both the PTFE component and the carbon component were detected in the conductive composite materials according to Examples 1 to 3.

Figure 5A:
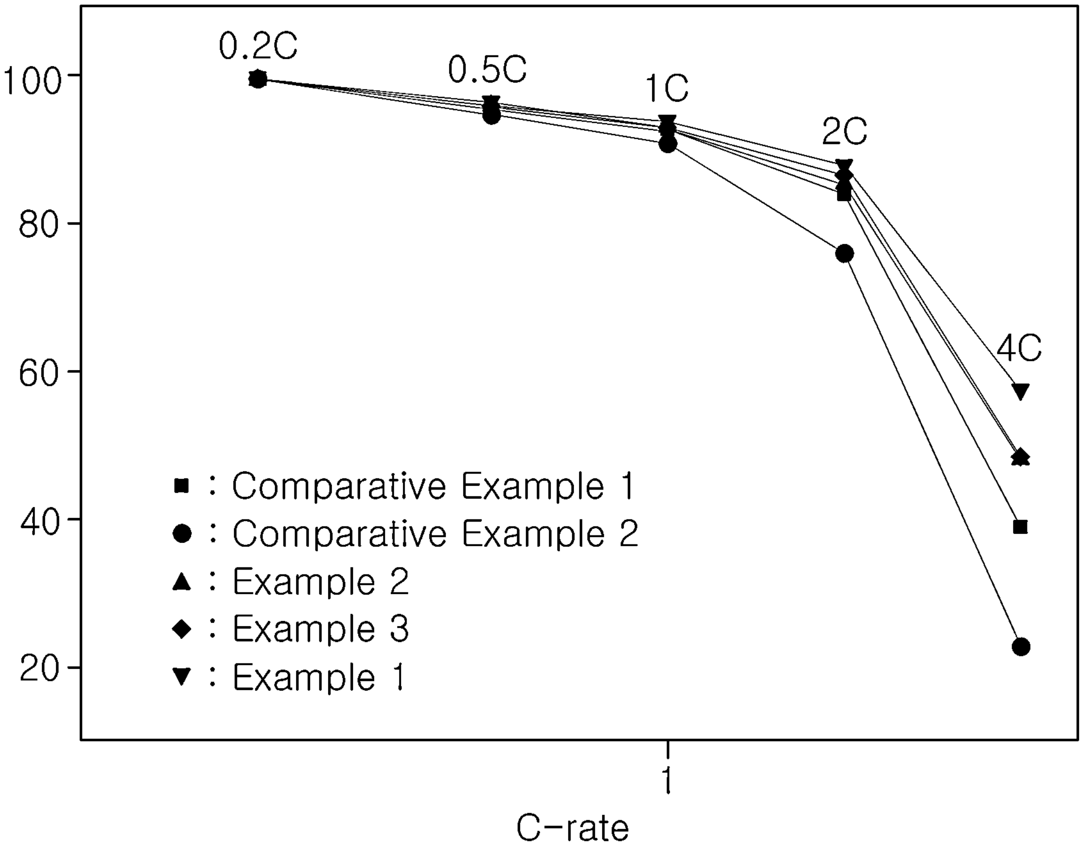
FIGS. 5A to 5C show electrochemical characteristics of Comparative Examples and Examples depending on the type of cathode active material.
Figure 5B:
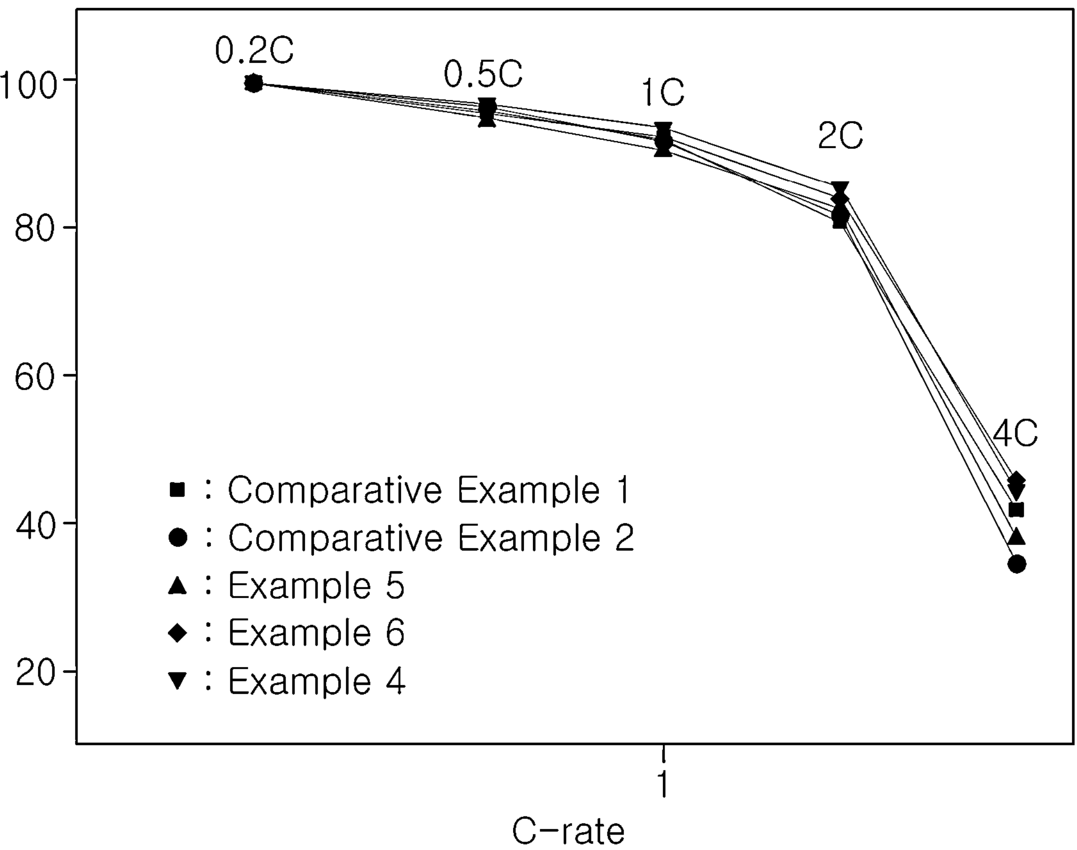
Figure 5C:
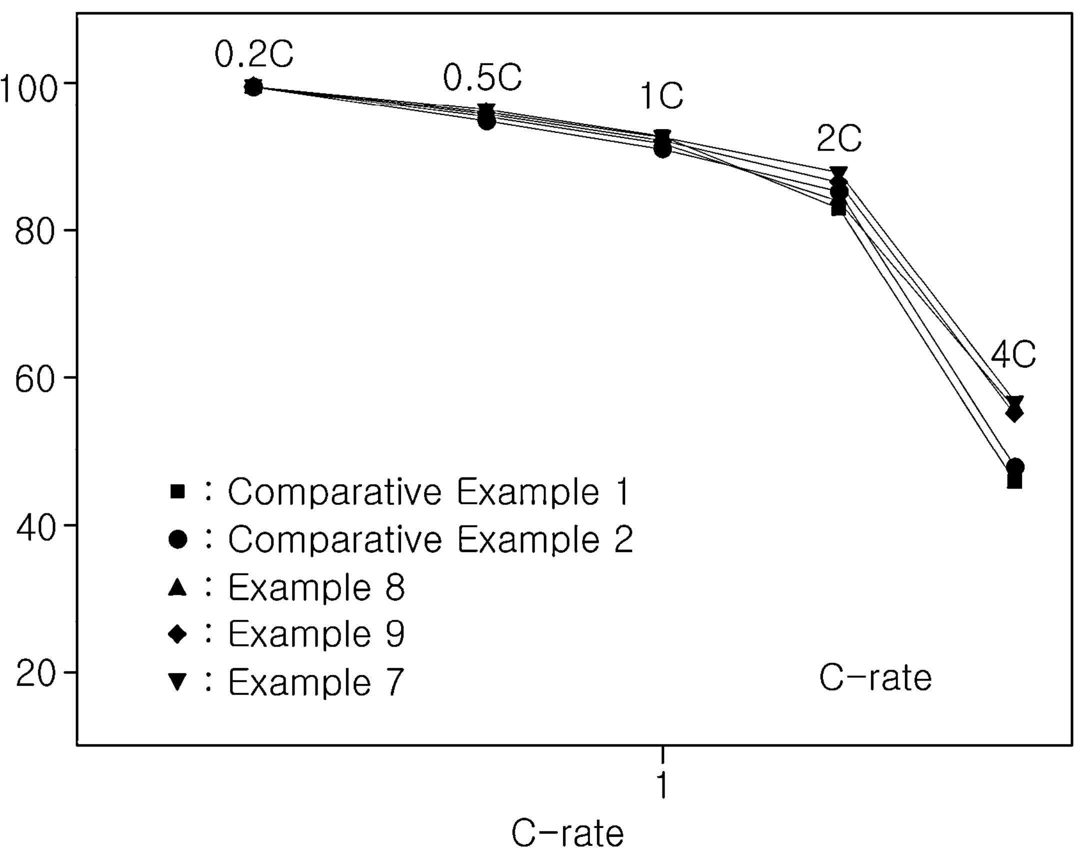

In addition, output characteristics were measured to determine electrochemical characteristics of Comparative Examples and Examples depending on a change in the type of cathode active material, and the results thereof are shown in FIGS. 5A to 5C.

As shown in FIGS. 5A to 5C, it was confirmed that the conductive composite material of the disclosure was improved in output characteristics even when applied to various types of cathode active materials, compared to Comparative Examples 1 and 2.

Figure 6A:
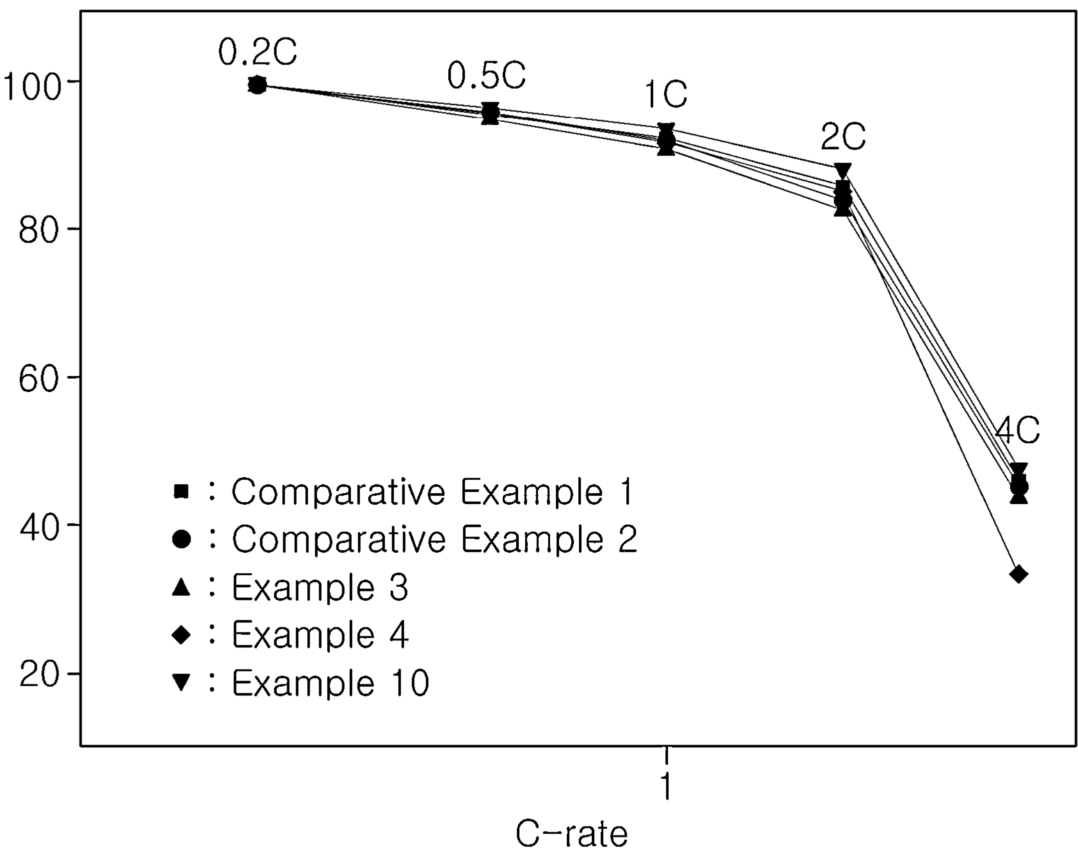
FIGS. 6A and 6B show electrochemical characteristics of Comparative Examples and Examples depending on the proportion of a cathode active material.
Figure 6B:
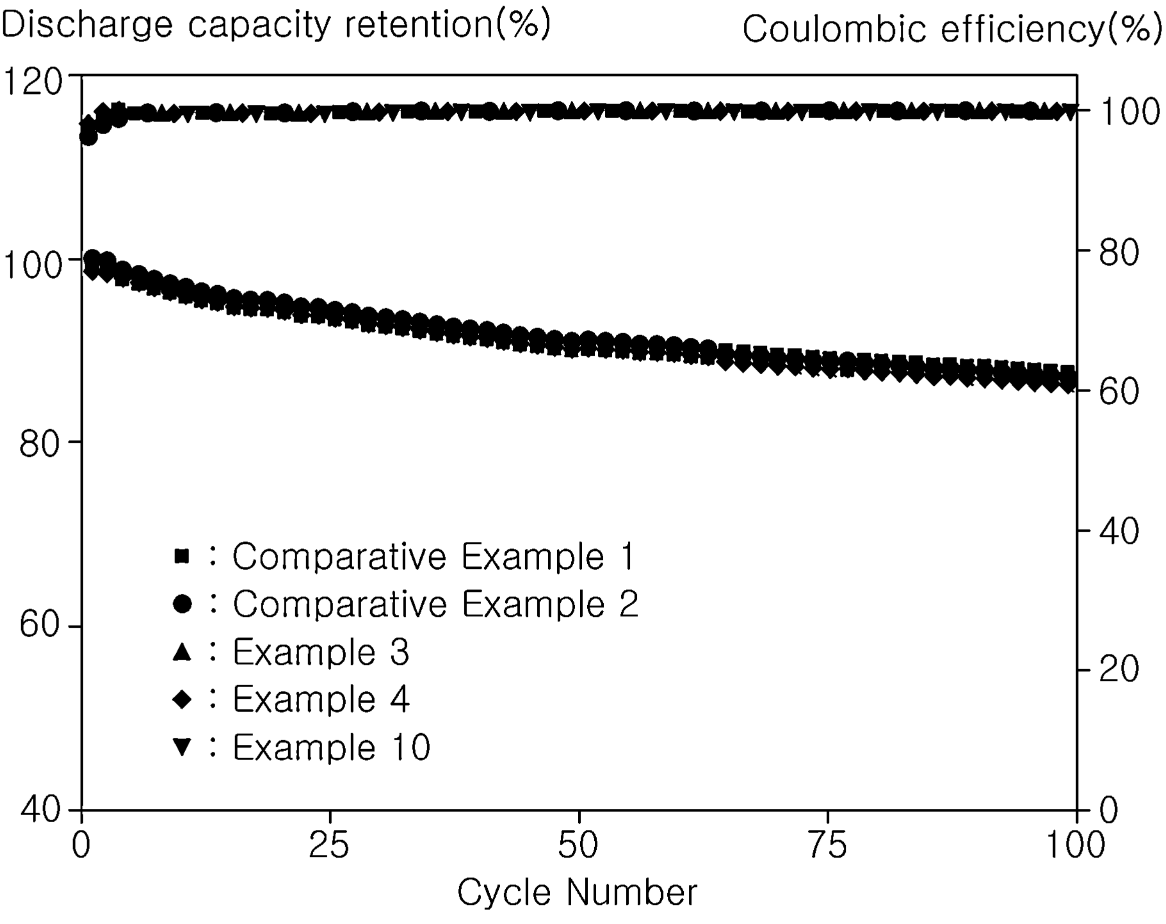

In addition, in order to evaluate the electrochemical characteristics of Comparative Examples and Examples depending on a change in the proportion of the cathode active material, output characteristics and lifespan characteristics were measured, and the results thereof are shown in FIGS. 6A and 6B. FIG. 6A shows the output characteristics of Comparative Examples and Examples depending on a change in the proportion of the cathode active material, and FIG. 6B shows the lifespan characteristics of Comparative Examples and Examples depending on a change in the proportion of the cathode active material.

As shown in FIG. 6A, although the amount of the cathode active material, which has lower electrical conductivity than the conductive material, was increased from 96 wt % to 98 wt % and the amount of the conductive material was decreased from 2 wt % to 1 wt %, it was confirmed that the output characteristics were improved when using the conductive composite material of the disclosure.

Moreover, as shown in FIG. 6B, when the conductive composite material of the present disclosure was used, it was confirmed that the lifespan characteristics were not decreased compared to Comparative Examples.

Therefore, according to the present disclosure, the process of mixing a coating material that is applied onto an electrode substrate to manufacture a cathode can be simplified to two steps of mixing a cathode active material and a conductive composite material, rather than the conventional three steps of mixing a cathode active material, a conductive material, and a binder, and thus, performance of a lithium secondary battery manufactured using the same can be maintained at the level equivalent to that of a conventional lithium secondary battery or output characteristics thereof can be improved.

A method of preparing a conductive composite material may include ionizing carbon-based particles in a predetermined polarity, ionizing polytetrafluoroethylene (PTFE)-particles in a polarity different from that of the carbon-based particles, and chemically bonding the ionized carbon-based particles and the ionized PTFE particles, which are ionized in different polarities, to each other.

Ionizing carbon-based particles may comprise preparing a first dispersion by dispersing the carbon-based particles and a first ionizing surfactant in an organic solvent. Ionizing PTFE particles may comprise preparing a second dispersion by dispersing the PTFE particles and a second ionizing surfactant in an organic solvent.

The first ionizing surfactant may be a ribonucleic acid (RNA)-based anionic surfactant. The second ionizing surfactant may be a cetyltrimethylammonium bromide (CTAB)-based cationic surfactant.

In the first dispersion, the carbon-based particles and the first ionizing surfactant may be dispersed in a weight ratio of about 1:0.01 to about 1:1. In the second dispersion, the PTFE particles and the second ionizing surfactant may be dispersed in a weight ratio of about 1:0.01 to about 1:1.

The chemically bonding may include mixing and stirring the first dispersion and the second dispersion to prepare a stirred mixed dispersion. A composite product may be separated from the stirred mixed dispersion, and the separated composite product may be dried to obtain a composite material in a powder form.

In the stirred mixed dispersion, the first dispersion and the second dispersion may be mixed such that the ionized carbon-based particles and the ionized PTFE particles are present in a weight ratio of about 0.1:1 to about 1:1.

The composite product may be separated from the mixed dispersion by centrifuging the mixed dispersion.

The separated composite product may be dried at a temperature in a range of about 20° C. to about 100° C.

A conductive composite material is provided in which carbon-based particles ionized in a predetermined polarity and PTFE particles ionized in a polarity different from that of the carbon-based particles are chemically bonded to each other.

The ionized carbon-based particles and the ionized PTFE particles may be bonded through any one selected from the group consisting of: an ionic bond, a π-π transition bond, a hydrogen bond, and/or combinations thereof.

The ionized carbon-based particles and the ionized PTFE particles may be bonded in a weight ratio of about 0.1:1 to about 1:1.

The carbon-based particles may be at least one selected from the group consisting of: carbon allotropes including carbon black, vapor grown carbon fiber (VGCF), graphite, carbon nanotube (CNT), graphene, fullerene, and combinations thereof.

A lithium secondary battery may include a cathode including a conductive composite material in which carbon-based particles ionized in a predetermined polarity and PTFE particles ionized in a polarity different from that of the carbon-based particles are chemically bonded to each other, an anode including an anode active material, and an electrolyte.

The cathode may comprise an electrode substrate, and the cathode active material and the conductive composite material may be disposed onto the electrode substrate.

As is apparent from the above description, a process of preparing a conductive composite material can be simplified by separately ionizing dry PTFE particles and carbon-based particles and chemically bonding these particles in a solvent.

In addition, when a cathode is manufactured using the conductive composite material in which PTFE particles and carbon-based particles are chemically bonded as described herein, the energy density of lithium secondary batteries can be expected to increase by decreasing the proportion of the conductive composite material that is mixed and thus relatively increasing the proportion of the cathode active material that is mixed.

In addition, high loading and high electrode density can be realized because the electrode can be manufactured in a dry manner due to use of the conductive composite material.

Although specific examples have been explicitly disclosed for illustrative purposes with reference to the appended drawings, the present disclosure is not limited thereto, and is defined by the accompanying claims. Therefore, those skilled in the art will appreciate that various modifications, additions and substitutions are possible, without departing from the scope and spirit of the disclosure defined in the accompanying claims.

What is claimed is:

1. A method of preparing a conductive composite material, the method comprising:

ionizing carbon-based particles in a polarity;

ionizing polytetrafluoroethylene (PTFE) particles in a polarity different from the polarity of the carbon-based particles; and chemically bonding the ionized carbon-based particles and the ionized PTFE particles to each other.

2. The method according to claim 1, wherein the ionizing carbon-based particles comprises dispersing the carbon-based particles and a first ionizing surfactant in an organic solvent to prepare a first dispersion, and wherein the ionizing PTFE particles comprises dispersing the PTFE particles and a second ionizing surfactant in an organic solvent to prepare a second dispersion.

3. The method according to claim 2, wherein the first ionizing surfactant is a ribonucleic acid (RNA)-based anionic surfactant, and the second ionizing surfactant is a cetyltrimethylammonium bromide (CTAB)-based cationic surfactant.

4. The method according to claim 2, wherein the first dispersion comprises the carbon-based particles and the first ionizing surfactant dispersed in a weight ratio of about 1:0.01 to about 1:1, and the second dispersion comprises the PTFE particles and the second ionizing surfactant dispersed in a weight ratio of about 1:0.01 to about 1:1.

5. The method according to claim 2, wherein the chemically bonding comprises:

mixing the first dispersion and the second dispersion together and stirring to form a stirred mixed dispersion;

separating a composite product from the stirred mixed dispersion; and drying the separated composite product to obtain a composite material in powder form.

6. The method according to claim 5, wherein the stirred mixed dispersion comprises the carbon-based particles and the PTFE particles in a weight ratio of about 0.1:1 to about 1:1.

7. The method according to claim 5, wherein the composite product is separated by centrifuging the stirred mixed dispersion.

8. The method according to claim 5, wherein the separated composite product is dried at a temperature in a range of about 20° C. to about 100° C.

9. A conductive composite material comprising carbon-based particles ionized in a polarity and polytetrafluoroethylene (PTFE) particles ionized in a polarity different from the polarity of the carbon-based particles, wherein the ionized carbon-based particles and the ionized PTFE particles are chemically bonded to each other.

10. The conductive composite material according to claim 9, wherein the ionized carbon-based particles and the ionized PTFE particles are bonded through any one selected from the group consisting of: an ionic bond, a $\pi$-$\pi$ transition bond, a hydrogen bond, or combinations thereof.

11. The conductive composite material according to claim 9, wherein the ionized carbon-based particles and the ionized PTFE particles are bonded in a weight ratio of about 0.1:1 to about 1:1.

12. The conductive composite material according to claim 9, wherein the carbon-based particles are at least one selected from the group consisting of: carbon allotropes comprising carbon black, vapor grown carbon fiber (VGCF), graphite, carbon nanotube (CNT), graphene, and fullerene.

13. A lithium secondary battery, comprising:

a cathode comprising a conductive composite material and a cathode active material, wherein the conductive composite material comprises:

carbon-based particles ionized in a polarity; and polytetrafluoroethylene (PTFE) particles ionized in a polarity different from the polarity of the carbon-based particles, wherein the ionized carbon-based particles and the ionized PTFE particles are chemically bonded to each other;

an anode comprising an anode active material; and an electrolyte.

14. The lithium secondary battery according to claim 13, wherein the cathode comprises an electrode substrate, and wherein the cathode active material and the conductive composite material are disposed onto the electrode substrate.

* * * * *